United States Patent [19]

Helle

[11] 4,232,216
[45] Nov. 4, 1980

[54] METHOD AND DEVICE FOR READING CODED INFORMATION IN THE FORM OF INTERVALS OF PREDETERMINED SIZES

[75] Inventor: Michel Helle, Marcq, France

[73] Assignee: Compagnie Internationale pour l'Informatique CII-Honeywell Bull (Societe Anonyme), Paris, France

[21] Appl. No.: 968,789

[22] Filed: Dec. 12, 1978

[30] Foreign Application Priority Data

Dec. 30, 1977 [FR] France .................. 77 39749

[51] Int. Cl.$^2$ .................. G06K 7/10; G06K 7/08; G11B 5/09; G06K 9/04
[52] U.S. Cl. .................. 235/449; 235/462; 340/146.3 C; 360/43
[58] Field of Search .................. 360/113, 43, 124; 340/146.3 C, 146.3 Z, 146.3 R, 149 R, 149 A, 147 R; 235/449, 450, 379, 462, 463, 493

[56] References Cited

U.S. PATENT DOCUMENTS

| | | | |
|---|---|---|---|
| 3,044,696 | 7/1962 | Feissel | 235/493 |
| 3,286,233 | 11/1966 | Lesueur | 340/146.3 C |
| 3,309,667 | 3/1967 | Feissel | 340/146.3 C |
| 3,949,193 | 4/1976 | Dowdell | 360/43 |
| 4,040,113 | 8/1977 | Gorter | 360/113 |
| 4,072,994 | 2/1978 | Takashima | 360/124 |
| 4,087,789 | 8/1978 | Beery | 340/146.3 C |

FOREIGN PATENT DOCUMENTS 2289010 5/1976 France .

*Primary Examiner*—Robert M. Kilgore
*Attorney, Agent, or Firm*—Kerkam, Stowell, Kondracki & Clarke

[57] ABSTRACT

A device for reading an item of information defined by a plurality of different intervals between consecutive elements on a data carrier, and corresponding methods of recognizing an item of information defined by a plurality of different intervals between consecutive pulses of a first pulsed signal. The device includes first and second element detectors arranged for motion relative to the elements on the data carrier, which detectors generate responses to the elements. The element detectors are spaced from each other by a distance e such that the responses to each element generated by said second element detector have a time delay e corresponding to the physical distance e with respect to the responses generated by said first element detector. The device further includes means for comparing the response of said first and second element detectors to produce an output signal representing the item of information. The distance e is selected and the comparison is such that a first interval a is identified when the beginning of a response by said second element detector occurs during a response by said first element detector, and a second interval b is identified when the end of a response by said first element detector occurs during a response by said first element detector.

16 Claims, 6 Drawing Figures

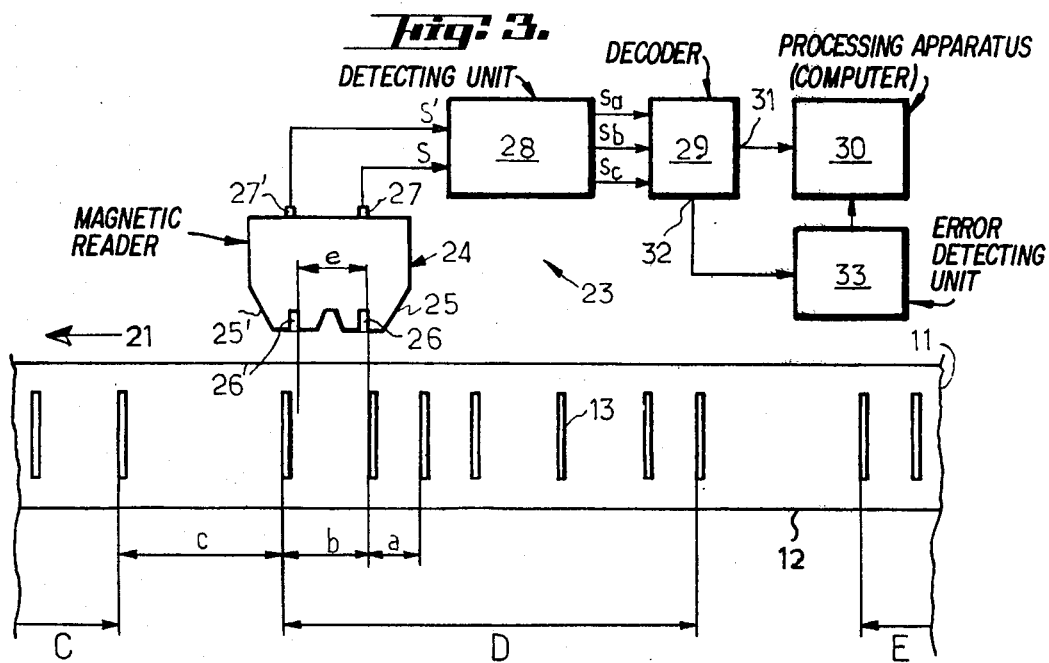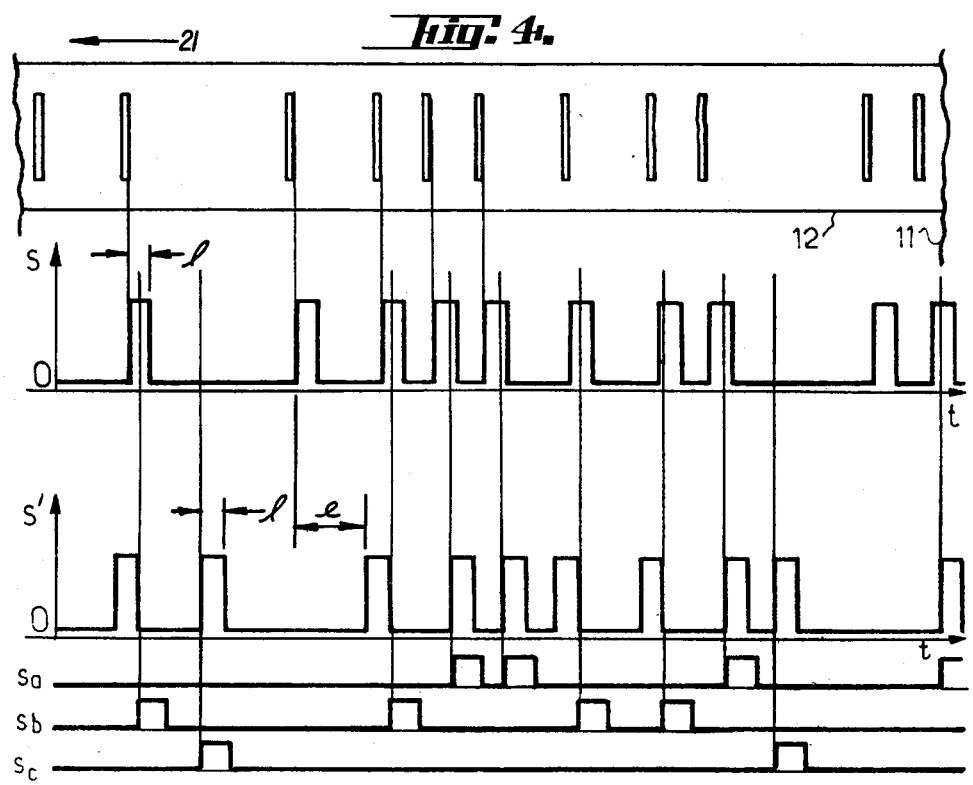

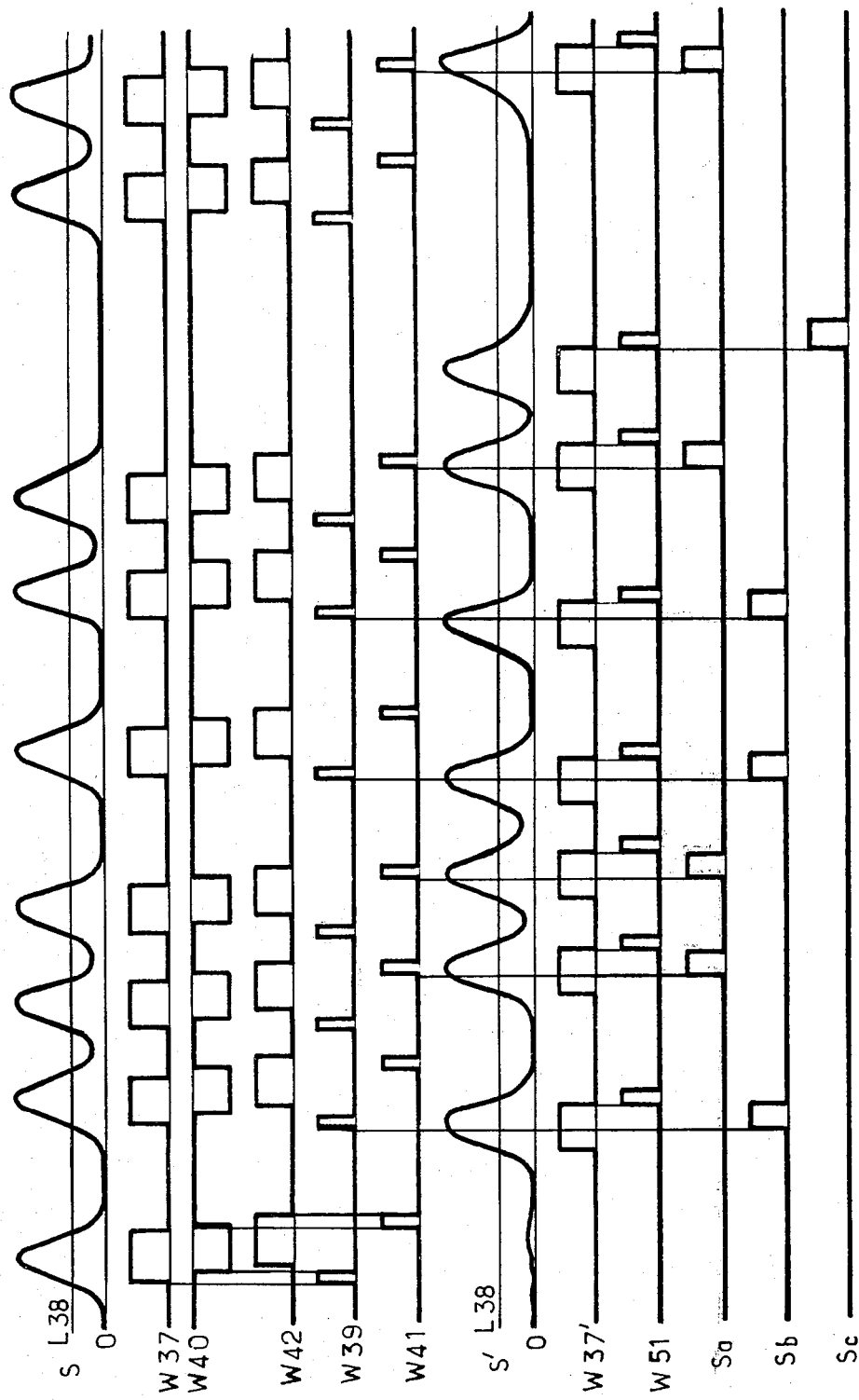

METHOD AND DEVICE FOR READING CODED INFORMATION IN THE FORM OF INTERVALS OF PREDETERMINED SIZES

BACKGROUND OF THE INVENTION

The present invention relates to methods and arrangements for reading bar coded information in the form of intervals of predetermined sizes between elements or bars.

One example of such coding is that currently used by banks to record identifying information on individual documents (such as checks) which are provided to customers to allow them to perform predetermined transactions. The identifying information may comprise the code numbers of the bank, the branch, the account of the drawer, and the type of document. It is on the basis of this particular example that the invention is described and illustrated herein. It will, however, be appreciated that the invention is not in any sense restricted to this particular example.

A plurality of codes have been adopted by businesses handling money. In Europe, and particularly in the Latin countries, the code most widely employed is that known by the abbreviation CMC 7 (meaning "Coded Magnetic Characters comprising 7 elements"). This is a method of representing alphabetical and numerical information which has the advantage of being readable both by a machine and by an untrained human. In effect, the way in which each group of seven elements, which are arranged vertically, parallel to one another, appears on the document suggests the shape of the character in question. In order to allow each character to be recognized by a machine, the seven elements are differently separated from one another by predefined short or long intervals. The numeral "0" for example is defined by, reading from left to right, a sequence of two short intervals, two long intervals and two short intervals. The numeral "1" is defined by one long interval, three short intervals, one long interval and one short interval; the letter A by one short interval, one long interval and four short intervals; the letter D by one long interval, two short intervals, two long intervals and one short interval; and the letter Z by two short intervals, two long intervals and two short intervals.

In addition, each character is separated from each adjacent character by an "inter character" interval which is longer than the other two intervals. The inter-character interval may also be termed a very long interval. The CMC 7 code requires the short, long and very long intervals to be of the following respective sizes: 300, 500 and 950 micrometers.

A more detailed description of the CMC 7 code, its manner of use, and reading devices therefor is found in the following U.S. Patents, the entire disclosures of which are hereby incorporated by reference: U.S. Pat. Nos. 3,044,696—Feissel; 3,286,233—Lesueur; and 3,309,667—Feissel et al.

The information is read by magnetic readers. Accordingly, the elements (also called bars) are printed on the document in an ink which can be permanently magnetized, and the reading heads are preceded by a magnetizing device designed to magnetically saturate the elements.

At the present time decoding is performed using one of the following two prior art principles or methods:

The first reading method comprises causing the document to move past only one reading head. The reading head responds to the magnetic transitions which the leading and trailing edges of each element represent in its air-gap by generating positive and negative pulses in the respective cases. The machine then uses as a reference only a single polarity of pulse to allow it to distinguish between the long and short intervals on the basis of the times at which pulses having this polarity appear. The physical intervals between bars are thereby converted by the machine into intervals of time. It will be apparent that detection can only be reliable if the speed of movement of the document relative to the reading head is stable.

In the second method of reading, the short and long intervals between elements are distinguished by spacing two reading heads apart in the direction of movement of the documents by a distance equal to one of the intervals. If the interval selected for reading head spacing is the short one, the two signals emitted by the two heads correspond when a short interval on the document is between them and they fail to correspond in the case of a long interval. If the interval selected for reading head spacing is the long one, the signals are just the opposite.

This second method of reading has the advantage over the first of dispensing with the measurement of the intervals in terms of time and providing instead physical measurement of the intervals. A detailed description of such readers will be found in a French patent application entitled "Arrangement for Reading Data" which was filed in France as No. 74-35418 on Oct. 22, 1974 by the societe anonyme styled "Compagnie Industrielle des Telecommunications CIT-ALCATEL", a company domiciled in France, and which is now French Patent No. 2,289,010. In addition, a reader implementing this second method is described below with particular reference to FIGS. 1 and 2.

A variation on the two-head reader is a three-head reader disclosed in a commonly-assigned copending U.S. patent application Ser. No. 936,693, filed Aug. 25, 1978 by Daniel Maussion, and entitled "BAR CODE READING DEVICE", the entire disclosure of which is hereby incorporated by reference. Briefly, in the Maussion bar code reading device a read head includes three element detectors physically spaced such that the first and second detectors are separated by a distance equal to a short interval and the first and third detectors are separated by a distance equal to a long interval. Suitable circuitry connected to the detectors identifies a short interval when the first and second detectors simultaneously detect character elements, and identifies a long interval when the first and third detectors simultaneously detect character elements.

This second method of detection or reading by comparing the degree of simultaneity with which the signals appear is theoretically independent of the speed of movement of the document past the two reading heads. However, if, like those described in the case of the first method of reading set forth above, the magnetic readers are sensitive to transitions in the magnetic induction field, the detected signal is proportional to the derivative of the magnetic induction field with respect to time (dB/dt), that is to say proportional to the relative speed of movement of the document in the case of magnetic transitions which are otherwise equal. To obtain correct signals from readers of this kind, it is therefore necessary to have relatively high speeds of movement. In this case, the second method of detection has only the advantage that the speeds do not have to be stabilized.

With the object of making detection genuinely independent of the speed of movement of the documents relative to the readers, readers have been produced using magneto-resistors. The latter are electrical resistors which are deposited on a substrate of insulating material in the form of thin films or layers of very small thickness (from a few hundred Angstroms to a few microns) whose resistance R varies when they are subjected to a magnetic field. In such a reader, a measuring magneto-resistor R is connected to the terminals of a current generator I. When an element or bar, duly magnetized, appears in front of this magneto-resistor, the magnetic field of the bar causes a change in resistance $\Delta R$ in the resistor proportional to the strength of the magnetic field. This change is converted by the current generator into a variation in voltage $\Delta V = (I)(\Delta R)$. The ratio $\Delta R/R$ is termed the coefficient of magneto-resistance. Detailed descriptions of magnetic readers of this kind will be found in the following commonly-assigned U.S. patent applications, the entire disclosures of which are hereby incorporated by reference: Ser. No. 899,383, filed Apr. 24, 1978 by Jean-Pierre Lazzari and Michel Helle, and entitled "Magnetic Transducer Device for Detecting Coded Magnetic Information and Method of Producing Said Device"; and Ser. No. 899,217, filed Apr. 24, 1978 by Jean-Pierre Lazzari and entitled "Device for Reading Magnetic Information".

It will be seen from this brief description of magneto-resistive readers that they are not sensitive to changes in magnetic field but only react to the strength of this field, with the result that reading is completely independent of the speed of movement of the documents read.

To sum up, a reader having twin magneto-resistive heads differentiates between long and short intervals irrespective of the speed of reading. In operation, the machine counts six intervals and determines the relevant character and then counts another six intervals to determine the next character, thus repeating the count iteratively.

Although in theory this reader appears to be entirely satisfactory as regards standard of performance and reliability in reconstituting data, in practice it has major disadvantages.

One of its disadvantages lies in the production of the electronic circuits which are used to differentiate the short intervals from the long intervals. In effect, the operative edges of the signals from the two reading heads should theoretically be simultaneous when an interval between bars corresponds to that which separates the two heads. In actual fact, one of these two signals may arrive before or after the other because of slight differences in the position of the bars relative to one another, these slight differences being inherent in the devices for printing the bars and in the carrier or substrate selected. Therefore, to make a comparison between the two detected signals, it is necessary to delay one of the two signals so that in all possible cases it will always be delayed with respect to the other signal. This makes it necesary to have more extensive processing electronics than are required with the above-mentioned first method of reading.

However, the basic cause of the major disadvantages of twin-head readers produced hitherto is that they detect only two intervals (long and short) out of the three which exist, and these disadvantages become apparent when documents are being read which contain inking faults inherent in the coding techniques (a lack of ink or, conversely, the presence of ink splodges).

In effect, it was seen above that, in detection by the second method, the fact of the signals read being simultaneous confirms the existence of a given interval (short for example) if this is the interval by which the two heads are separated; while if the two detected signals are not simultaneous, the other interval (long in this example) is assumed to be present. However, in reality, the fact of non-simultaneity only proves that the interval is not short, i.e., it may be long or very long. This being the case, it will be appreciated how many uncontrollable confusions there may be when, because of an inking fault which is very common in CMC 7 coding, there is a wrong interval in six intervals counted, which may then falsify the whole of the reading of the corresponding document.

By way of example, let it be assumed that the reader has its two reading heads separated by a short interval and that it is presented with an actual character D (the code of which is as defined above: one long interval, two short intervals, two long intervals and one short interval) having two inking faults as follows: a lack of ink in the first bar (that furthest to the left of the document) and the presence of an ink splodge in front of the last bar (this splodge simulating the existence of another bar marking a short interval). If it is also assumed that the reading takes place from the right of the document to the left, the machine will first of all read the false short interval simulated by the ink splodge and then a genuine short interval, two long intervals, and two short intervals, these six intervals representing the character Z defined above. The lack of ink in the first bar, which is the last one read, will not reflect the error in the rest of the reading. However, when it is present, the machine will consider the long interval which separates the first bar from the second bar as a very long (inter-character) interval and the very long interval which follows as the first long interval of a second character, which will cause the next item of information to be wrongly interpreted.

The first method of reading, by virtue of its absolute detection of the intervals, is capable of recognizing all the kinds of interval, provided that the speed of movement of the document is very stable, and thus of indicating to the operator the existence of a fault in the printing of a character. However, the production of such readers and the restrictions which they impose in operation constitute a serious handicap, since, in addition to the fact that the magnitude of the read-out signal is a function of the speed of movement of the document relative to the reading head, the presence of air-gaps means that the head is very sensitive to the distance separating it from the document, the maximum distance generally permitted being equal to the size of the air-gap (in the order of a few tens of microns).

SUMMARY OF THE INVENTION

The present invention has as an object to overcome all the above-mentioned disadvantages of prior art magnetic readers. In other words, it is directed to a magnetic reader implementing a method of differentiating between the intervals which is independent of the speed of movement of the document relative to the reader, which enables printing faults in the characters to be detected, and which is simple, easy and inexpensive to produce.

It is another object of the invention to provide an improved twin-head reader and method of reading.

Briefly stated, and in accordance with one aspect of the invention, a method of recognizing an item of information defined by a plurality of different intervals between consecutive pulses of a first pulsed signal includes the steps of generating a second pulsed signal the pulses of which are delayed with respect to corresponding pulses of the first pulsed signal by a delay interval e; and comparing the first and second pulsed signals to produce an output signal representing the item of information, the delay interval being selected and the comparison being such that a first interval a is identified when a leading edge of a pulse of the second signal occurs during a pulse of the first signal and a second interval b is identified when a trailing edge of a pulse of the second signal occurs during a pulse of the first signal.

In accordance with a further aspect of the invention, in a method as stated above, a third interval c is identified during the step of comparing when neither a leading nor a trailing edge of a pulse of the second signal occurs during a pulse of the first signal.

In accordance with a more general aspect of the invention, a method for re-constituting an item of information by differentiating between the sizes of a first plurality m of different intervals which represent the distances separating pairs of consecutive pulses of a pulsed signal whose pulses are each of a predetermined minimum length l involves the formation of a second plurality n of separate signals comprising the pulsed signal and delayed versions which are differently delayed in relation to the pulsed signal by amounts e. The signals are compared with one another to produce an output signal representing the item of information. Specifically, each delay e between a first and a second signal of the second plurality n is defined in such a way that a first interval a of the first plurality m is identified when a leading edge of a first pulse of the second signal occurs during a first pulse of the first signal and a second interval b of the first plurality m is identified when a trailing edge of a second pulse of the second signal occurs during a second pulse of the first signal. As a result, the absence of an edge of a pulse of the second signal during a pulse of the first signal corresponds to an interval of the plurality m which is different from the first and second intevals, and the number n is dictated by the number of delays e so established which are required to cover the plurality m of intervals.

Thus, the physical arrangement to implement this method for reading an item of information which is defined by the relative arrangement of m different intervals and which is carried on a data carrier, comprises a plurality n of reading heads which are separated from one another consecutively by various spacings e and which are arranged to read the item of information from the data carrier at different respective times and thus to provide a plurality n of pulsed signals which are identical but differently delayed from one another in proportion to the spacings. The arrangement further comprises a circuit for processing the pulsed signals in relation to each other, characterized in that the spacing e between two different heads to define two different intervals a, b satisfies the inequalities:

$$b-l<e<a+l, \text{ with } a-b+2l>0.$$

It should be noted that in the context of the present invention, the term "interval" may either refer to a physical interval in terms of space, distance, or physical width, or refer to a time interval in terms of a duration or delay. These two usages are essentially equivalent within the context of the invention because relative motion between a reading head and character elements or bars converts physical intervals into time intervals. In the conversion of the physical width of a character element or bar, it will be appreciated that the width of the resultant electrical signal pulse expressed in units of time depends not only on the physical width of the character element or bar and the speed of relative motion, but also on the size of the detector member and its resultant response width or resolution.

BRIEF DESCRIPTION OF THE DRAWINGS

The features and advantages of the invention will be more clearly apparent from the following description, which is given with reference to the accompanying drawings, in which:

FIG. 3 is an illustration similar to FIG. 1, but which illustrates an embodiment of reading arrangement according to the present invention;

FIG. 4 is an illustration similar to FIG. 2, but which illustrates the operation of the FIG. 3 arrangement according to the invention;

FIG. 6 shows waveforms obtained at various points in the decoding circuit of FIG. 5 during the operation of the circuit.

DESCRIPTION OF THE PREFERRED EMBODIMENT

Figure 1:
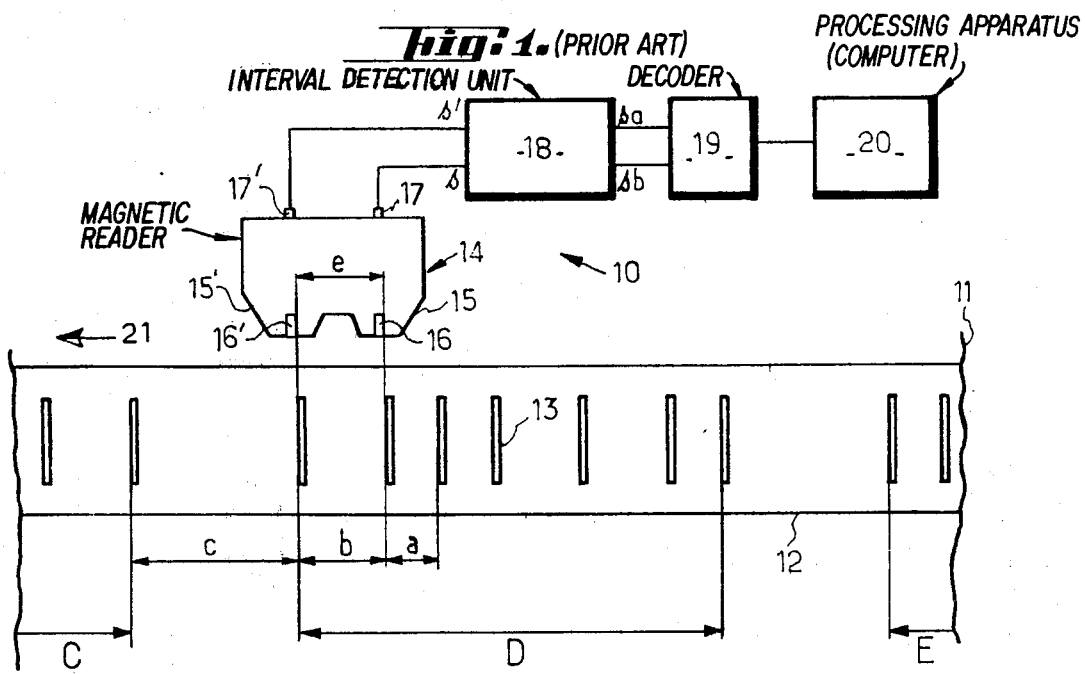
FIG. 1 is an illustration, partly in diagrammatic form and partly in block-diagram form, of a prior art CMC 7 reading arrangement, which is shown in association with the letters C, D and E present on a document.

A prior art arrangement 10 for reading an item of CMC 7 coded information shown diagrammatically in FIG. 1 employs the principles of the second method of reading described above in the "Background of the Invention". This prior art arrangement will now be considered in greater detail. The prior art arrangement 10 is illustrated in association with a document 11 provided with a track 12 in which characters are written in CMC 7 code. In FIG. 1, the characters shown are the letter D, the end of the letter C, and the beginning of the letter E. In reality, the seven elements or bars 13 making up each character are formed to give a visual representation of the relevant letter or figure.

The intervals between the bars 13 are shown substantially to scale. It will be recalled that an interval is defined by the distance which separates the same edges of two adjoining elements. In this way, the three intervals characteristic of the CMC 7 code can be distinguished, namely the short interval a (300 micrometers) the long interval b (500 micrometers), and the very long (intercharacter) interval c (950 micrometers).

The arrangement 10 comprises a magnetic reader 14 having two reading heads 15 and 15' which present to the document 11 a pair of element detectors in the form of magnetic transducer members 16 and 16', respectively, which members may either be air-gaps (if the heads are of the kind which employs magnetic flux variations) or magneto-resistors. The heads 15 and 15' are provided with respective output terminals 17 and 17' at which appear the signals s and s' detected by the transducer members 16 and 16'.

These two output signals s and s' are applied to respective ones of two input terminals of a unit 18 for detecting the long and short intervals a and b between the bars 13. Signals $s_a$ and $s_b$, representing the short and long intervals, are emitted from respective ones of two output terminals of the detection unit 18 and are applied to the input side of a decoder 19 which, each time six intervals are counted, determines the relevant character. The decoder 19 output signal, which represents the decoded characters, is supplied to a processing apparatus 20 such as a computer.

The essential characteristic of the reader 14 is the distance e which separates the transducer members 16 and 16'. In the embodiment illustrated, this distance e is equal to a long interval b. In a modified version, e may be equal to the short interval a.

Figure 2:
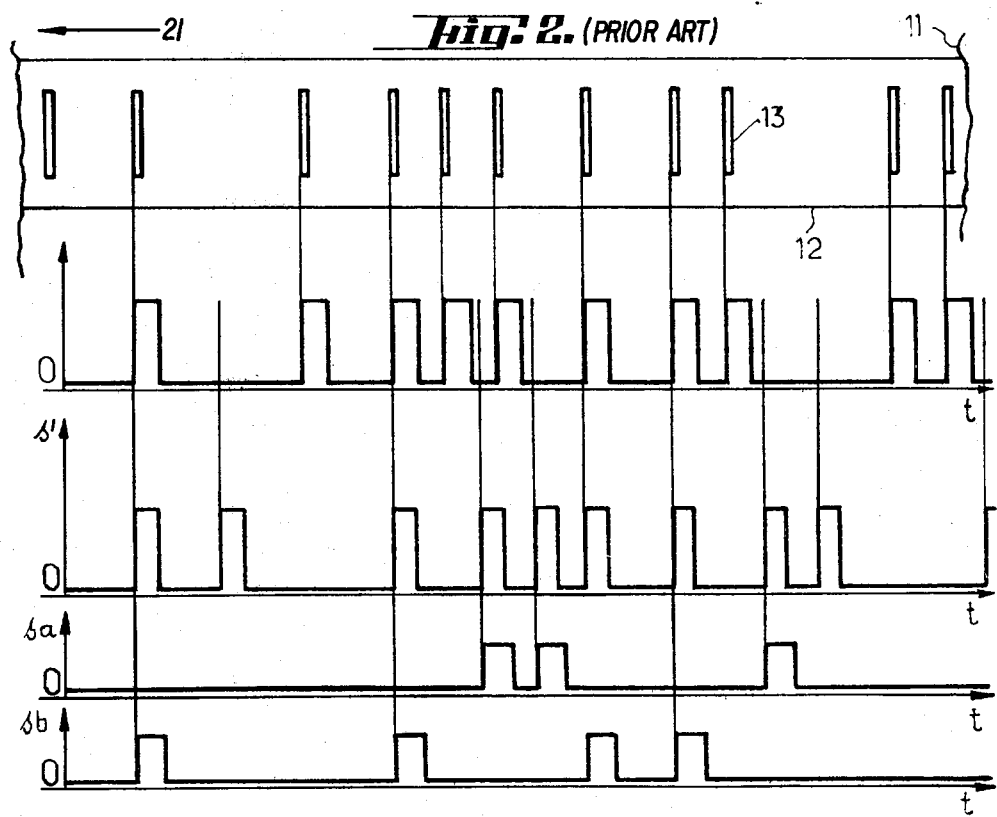
FIG. 2 illustrates the operation of the prior art arrangement shown in FIG. 1 by means of waveforms corresponding to the characters on the document shown in FIG. 1.

FIG. 2 illustrates the operation of the FIG. 1 arrangement 10. As in FIG. 1, the track 12 on the document 11 is shown, the track 12 passing in front of the magnetic reader 14 in the direction of arrow 21. FIG. 2 illustrates the waveforms which successively represent the output signals s and s' from the two reading heads 15 and 15', and the signals $s_a$ and $s_b$, respectively, representing the short and long intervals a and b generated by the detection unit 18, in relationship to the times at which the bars 13 successively pass in front of the two reading heads 15 and 15'.

It can be seen from FIG. 2 that if pulses of the signals s and s' appear simultaneously, this indicates, by means of signal $s_b$, the existence of a long interval b, while non-simultaneity is considered as indicating the presence of a short interval a. It will be noted that the last pulse of signal s' for each character is ignored owing to the fact that the six intervals are defined by the first six pulses of signal s' in relation to the first six pulses of signal s.

FIGS. 3 and 4, which show an embodiment of the invention, have been drawn up on the same principles as FIGS. 1 and 2 in order to allow a simple comparison to bring out the distinctive features of the invention as compared with the prior art.

In FIG. 3, an arrangement 23 according to the invention is shown in association with the same document 11 as is shown in FIG. 1. Furthermore, like the prior art arrangement 10, the inventive arrangement 23 comprises a magnetic reader 24 having two reading heads 25 and 25' which present to the document 11 respective ones of two element detectors in the form of transducer members 26 and 26' and which emit, from respective outputs 27 and 27', two signals S and S' intended for a detecting unit 28.

Unlike the detecting unit 18, the detecting unit 28 according to the invention provides three signals, $S_a$, $S_b$ and $S_c$, which represent respective ones of the three intervals a, b and c which characterize the CMC 7 code. A decoder 29 receives these three signals, reconstitutes the characters read, and passes them on to a processing apparatus 30 via an output 31. In addition, the decoder 29 has a second output 32 connected to an error detecting unit 33, the latter being intended to warn the operator of any reading errors and possibly to prevent an erroneous signal being recorded in the processing apparatus 30.

A significant structural difference between the FIG. 1 prior art reading arrangement 10 and the FIG. 3 inventive arrangement 23 is the distance e which separates the two transducer elements of the respective magnetic readers 14 and 24. From FIG. 3, it can be seen that in the reader 24 according to the invention the distance e between the transducer elements 26 and 26' is greater than the short interval a and less than the long interval b. In the prior art reader 14 it is essential that the distance e correspond exactly to one of the intervals a and b.

In accordance with the invention, the distance e is calculated in such a way that the signals S and S' emitted by the two reading heads are similar to those of the FIG. 4 waveforms. The signal S may be considered a primary pulsed signal, and S' a delayed version thereof. Thus in the illustrated embodiment the signal S has a delay of zero with respect to the primary pulsed signal. However, it will be appreciated that the signals S and S' may each be delayed with respect to the primary pulsed signal.

More particularly, as may be seen from FIG. 4, as a result of the particular spacing e between the transducer members 26 and 26', the different intervals a, b and c may be recognized or detected by the delay of the signals S and S' with respect to each other. A short interval a is detected when the leading edge of a pulse of the second (displaced) signal S' occurs during a pulse of the first signal S. An output pulse $S_a$ is then generated. A long interval b is detected when the trailing edge of a pulse of the second (displaced) signal S' occurs during a pulse of the first signal S. An output pulse $S_b$ is then generated A very long (inter-character) interval c is identified by the absence of any edge of a pulse of the second signal S' during a pulse of the first signal S. An output pulse $S_c$ is then generated.

In reality, the fact of no edge of a pulse of the second signal S' occurring during a pulse of the first signal S means that the corresponding interval is different from intervals a and b. In other words, if, instead of three different intervals, there were more, a fourth d (not shown) for example, the existence of an edge of a pulse of the second signal S' outside a pulse of the first signal S would mean that the interval was c or d. This ambiguity could be resolved by adding to the reader 24 a third head 25" (not shown) displaced from head 25' by a distance e' (not shown) such that a comparison between the signal S" (not shown) coming from head 25" (not shown) and the signal S' would allow a distinction to be made between the intervals c and d (not shown) by virtue of the fact that a leading or trailing edge of the third signal S" (not shown) occurred during a pulse of the second signal S'. In the context of this double comparison, if there were a pulse of the third signal S" (not shown) which had no edge occurring during a pulse of the second signal S, this would indicate the existence of an interval other than the four above. It should, therefore, be apparent that with three heads it is possible positively to identify the presence of five intervals.

It has thus been seen that two heads enable three intervals to be distinguished and that three heads would define five intervals. Taking what was said in connection with the ambiguity which the existence of a fifth interval would involve, it can be concluded that n reading heads would allow m different intervals to be definitely identified according to the following equation:

$$n = \text{the whole number part of } (m/2 + 1) \tag{1}$$

From equation (1) it can be seen that for $m=2$ or 3, $n=2$. For $m=4$ or 5, $n=3$. And so on.

However, the waveforms of FIG. 4 clearly bring out that correspondences between the edges of one signal and the pulses of a second signal only come into being if the length l of the pulses in question is neither too short nor too long in relation to the shortest interval a. In this connection, if the pulses of the signals S and S' in FIG. 4 were very short in relation to interval a, it would be found that there would then no longer be any value for the distance e between the two transducers members 26 and 26" which would meet differentiation criteria laid down as shown in FIG. 4. On the other hand, with excessively wide or long pulses, there would be the danger of the rising and declaying edges of the same pulse of signal S' occurring during two different pulses of signal S and thus of two separate intervals erroneously recognized as only one interval.

In the context of FIGS. 3 and 4, the calculation of the distance e in such a way as to identify two different intervals a and b while at the same time distinguishing these values from those of other possible intervals (such as c) begins with the following inequality from which the smallest possible value of the minimum pulse length l may be determined:

$$a - b + 2l > 0 \qquad (2)$$

where $$b > a,$$

as previously assumed.

The above inequality (2) leads to a definition of the distance e between the two transducer members 26 and 26' by way of the following dual inequality:

$$b - l < e < a + l. \qquad (3)$$

By extrapolating from this inequality (3) to cover the case of a code involving m different intervals of which p values, in pairs, satisfy the above inequalities (2) and (3), and particularly inequality (2), (owing to the fact that a comparison between two signals does in fact only distinguish two intervals from other possible intervals), it is found that the number n of reading heads required is given by the equation:

$$n = m - p/2 \qquad (4)$$

In the case presently concerned, the length l of the pulses of signals S and S' is 150 micrometers, i.e., half the short interval a. By using the above formulae, it can be established that:
(A) The inequality (2) is satisfied only in the case of the two values 300 micrometers and 500 micrometers, respectively, corresponding to intervals a and b. In other words, the length of the signal used only enables the intervals a and b to be differentiated from one another and from other possible intervals.
(B) Since only the two values for a and b satisfy the inequality (2), then $p=2$. From equation (4), $n=3-1=2$, meaning that two reading heads suffice.
(C) Finally, the distance e needed for differentiation of standard CMC 7 characters in accordance with the invention lies, from the dual inequality (3), within the range of 350 micrometers $< e <$ 450 micrometers. In the illustrated embodiment, e equals 400 micrometers.

Figure 5:
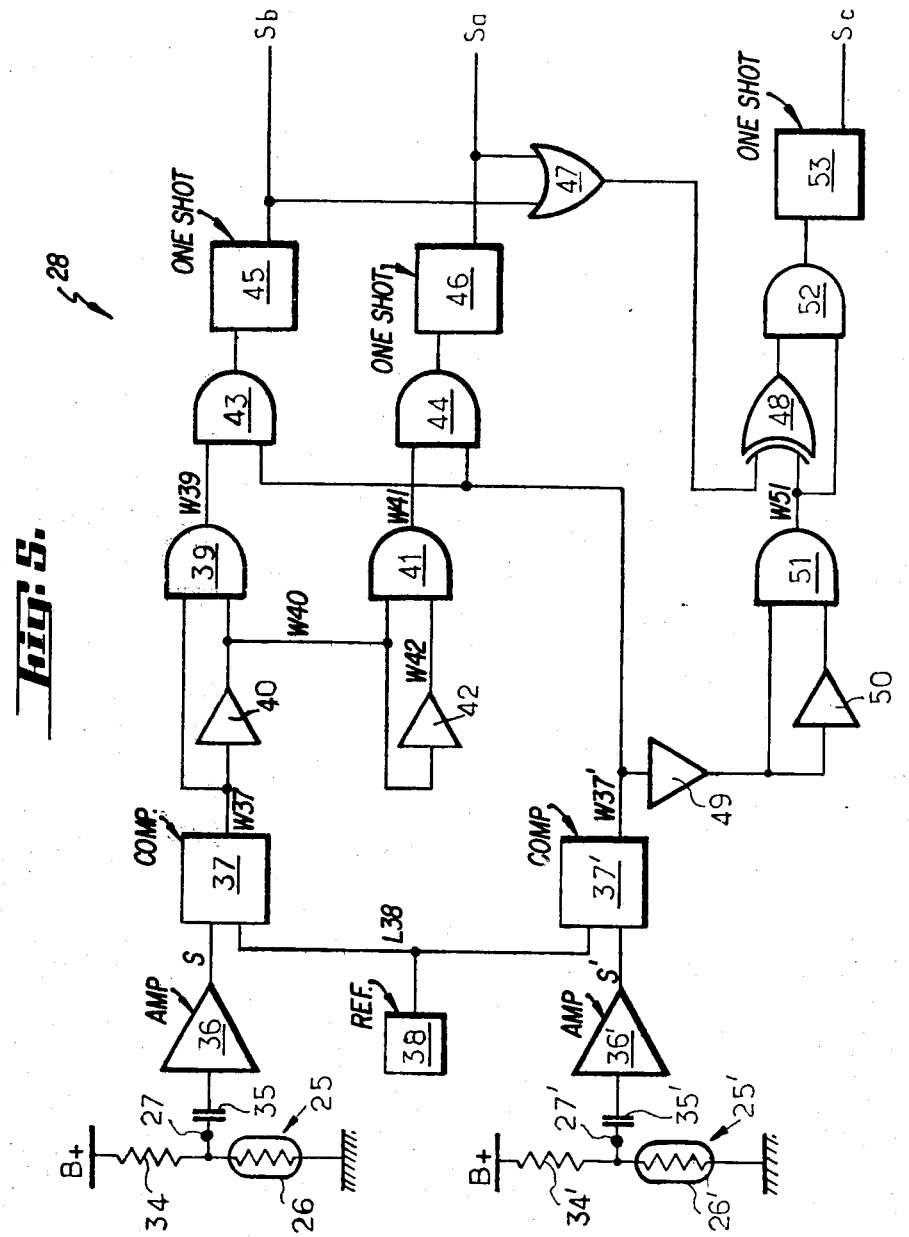
FIG. 5 is a diagrammatic illustration of an embodiment of the electronic decoding circuits of the arrangement according to the invention shown in FIG. 3.

FIG. 5 shows in detail an embodiment of the detecting unit 28 of the reading arrangement 23 shown in FIG. 3. The FIG. 5 detecting unit 28 cooperates with the two magneto-resistive heads 25 and 25' of FIG. 3, the magneto-resistive transducer elements 26 and 26' of which are also shown in FIG. 5.

In FIG. 5, the two magneto-resistors 26 and 26' of heads 25 and 25', respectively, are connected in series with resistors 34 and 34' between a source of positive DC voltage B+ and circuit ground. The junction points between the magneto-resistors 26 and 26' and the corresponding resistors 34 and 34' form the respective output terminals 27 and 27' of the reading heads 25 and 25'. These two terminals are connected by respective capacitors 35 and 35' to respective inputs of amplifiers 36 and 36', whose outputs are conected to the inputs of respective ones of two comparators or triggering threshold members 37 and 37', whose reference inputs are connected to a source 38 of threshold reference voltage.

The output of the threshold comparator 37 is connected directly to one input of an AND gate 39, and to another input of the AND gate via an inverter 40. The output of the inverter 40 is also connected to one input terminal of a second AND gate 41 and, via another inverter 42, to another input terminal of the AND gate 41. The AND gates 39 and 41 have their outputs connected to respective input terminals of two AND gates 43 and 44, whose other inputs are connected to the output of the threshold comparator 37'. The outputs of AND gates 43 and 44 are applied to respective ones of two monostable multivibrators or "one-shots" 45 and 46 which, from their respective outputs, supply the signals $S_b$ and $S_a$ which represent the long and short inter-element intervals. These two output signals are also applied to an OR gate 47 whose output is applied to an input terminal of an exclusive OR gate 48.

The output of the threshold comparator 37' also passes via an inverter 49 both directly and via an inverter 50 to the two input terminals of an AND gate 51, whose output is connected to the other input terminal of the exclusive OR gate 48 and to an input terminal of an AND gate 52 whose other input terminal is connected to the output of the exclusive OR gate 48. The output of the AND gate 52 is applied to the input of a monostable multivibrator "one shot" 53 which supplies from its output the signal $S_c$ representing the very long (inter-character) intervals.

FIG. 6 illustrates waveforms taken from various points in the circuit of FIG. 5 during the reading of the letter D and the beginning of the letter E from the track 12 illustrated in FIGS. 3 and 4. The signals S and S' are those emerging from the amplifiers 36 and 36' and thus represent the signals generated in the magneto-resistors 26 and 26' of the two reading heads 25 and 25'. L38 indicates the level of the voltage supplied by the threshold reference voltage source 38.

The waveforms W37 and W37' are those emerging from the threshold comparators 37 and 37', respectively, and they show that the edges of these two signals correspond to the times at which signals S and S' are greater than or equal to the comparison level L38.

The wavefrom W40 is that present at the output of the inverter 40. It can be seen that this inverter 40 causes a slight delay in the pulses W37 applied to its input.

Similarly, the waveform W42 which appears at the output of inverter 42 is delayed with respect to waveform W40.

Waveform W39 is made up of pulses whose leading (rising) edges respectively correspond to the leading (rising) edges of waveform W37 and whose trailing (falling) edges correspond to the leading edges of waveform W40. These waveform W39 pulses thus represent the leading edges of waveform W37.

Waveform W41 is made up of pulses whose leading (rising) edges correspond to the trailing (falling) edges of waveform W40 and whose trailing (falling) edges correspond to the trailing edges of the pulses of waveform W42. Waveform W41 is thus substantially representative of the times at which trailing edges occur in waveform W37.

In the same way as signal W37 is processed by inverters 40 and 42 and AND gate 41 to generate the signal W41 representing the trailing edges of waveform W37, signal W37' is processed by inverters 49 and 50 and AND gate 51 to generate a signal W51 representing the trailing edges of waveform W37'.

As was seen above, the signal $S_a$ comprises pulses whose leading edges coincide with those leading edges of the signal W41 which represent trailing edges of signal W37 which occur during a pulse of signal W37'.

Similarly, signal $S_b$ comprises pulses which indicate a long interval owing to the fact that a pulse of signal W39 representing a leading edge of signal W37 has occurred during a pulse of signal W37'.

Finally, in the example illustrated, the pulses forming signals $S_a$ and $S_b$ are sufficiently long to be capable of being compared with the pulses of signal W51. It will be noted that an inter-element interval is indicated by the fact of a pulse of signal $S_a$ or $S_b$ concurring during a pulse of signal W51. The inter-character interval c is indicated by the absence of such occurrence, this absence coinciding, in other words, with the absence of a pulse of signals W39 and W41 during the seventh and last pulse of each group of pulses representing a charcter in signal W37'.

Other methods, of course, could be envisaged for producing the detecting unit 28.

All the above description demonstrates that the invention could be extended to decoding any kind of information coded by means of any number of intervals of different sizes.

In other words, the invention is no way restricted to the embodiment which has just been described and illustrated and in fact covers all means which form technical equivalents of the means described, as well as combinations of these if the combinations are made within the scope of the invention as defined by the appended claims.

What is claimed is:

1. A method of recognizing an item of information defined by a plurality of different intervals between consecutive pulses of a first pulsed signal, said method comprising:
   generating a second pulsed signal the pulses of which are delayed with respect to corresponding pulses of the first pulsed signal by a delay interval e; and
   comparing the first and second pulsed signals to produce an output signal representing the item of information, the delay interval being selected and the comparison being such that a first interval a is identified when a leading edge of a pulse of the second signal occurs during a pulse of the first signal and a second interval b is identified when a trailing edge of a pulse of the second signal occurs during a pulse of the first signal.

2. A method according to claim 1, wherein a third interval c is identified during the step of comparing when neither a leading nor a trailing edge of a pulse of the second signal occurs during a pulse of the first signal.

3. A method according to claim 1, wherein:
   the pulses of the first and second signals have a minimum predetermined length l; and wherein
   the delay interval e satisfies the dual inequality $$b-l<e<a+l,$$

where $$a-b+2l>0.$$

4. A method according to claim 2, wherein:
   the pulses of the first and second signals have a minimum predetermined length l; and wherein
   the delay interval e satisfies the dual inequality $$b-l<e<a+l,$$

where $$a-b+2l>0.$$

5. A method of recognizing an item of information defined by a first plurality m of different intervals between consecutive pulses of a primary pulsed signal, said method comprising:
   generating a second plurality n of separate pulsed signals the pulses of which are differently delayed with respect to corresponding pulses of the primary pulsed signal by delay intevals e;
   comparing the pulsed signals of the second plurality n to produce an output signal representing the item of information, the delay interval e between a first and second signal of the second plurality being selected and the comparison being such that a first interval a of the first plurality m is identified when a leading edge of a pulse of the second signal occurs during a pulse of the first signal, a second interval b of the first plurality m is identified when a trailing edge of a pulse of the second signal occurs during a pulse of the first signal, and an interval of the first plurality m which is different from the first and second intervals a and b is identified when neither a leading nor a trailing edge of a pulse of the second signal occurs during a pulse of the first signal.

6. A method according to claim 5, wherein one of the pulsed signals of the second plurality n has a delay e of zero with respect to the primary pulsed signal.

7. A method according to claim 5, wherein:
   the pulses of the first and second signals have a minimum predetermined length l; and wherein
   the delay interval e satisfies the dual inequality $$b-l<e<a+l,$$

wherein $$a-b+2l>0.$$

8. A method according to claim 5, wherein the minimum number n of separate pulsed signals is determined by the equation $$n = m - p/2$$

where p is the number of intervals which, in pairs, satisfy the inequality $$a - b + 2l > 0.$$

9. A device for reading an item of information defined by a plurality of different intervals between consecutive elements on a data carrier, said device comprising:
first and second element detectors arranged for motion relative to the elements on the data carrier, generating responses to the elements, and spaced from each other by a distance e such that the responses to each element generated by said second element detector have a delay corresponding to the distance e with respect to the responses generated by said first element detector; and
means for comparing the responses of said first and second element detectors to produce an output signal representing the item of information, the distance e being selected and the comparison being such that a first interval a is identified when the beginning of a response by said second element detector occurs during a response by said first element detector, and a second interval b is identified when the end of a response by said first element detector occurs during a response by said first element detector.

10. A reading device according to claim 9, wherein a third interval c is identified by said comparing means when neither the beginning nor the end of a response by said second element detector occurs during a response by said first element detector.

11. A reading device according to claim 9, wherein:
the second interval b is greater than the first interval a; wherein
the responses generated by said element detectors have a minimum predetermined size l relative to the intervals a and b; and wherein
the distance e satisfies the dual inequality $$b - l < e < a + l,$$

where $$a - b + 2l > 0.$$

12. A reading device according to claim 10, wherein:
the second interval b is greater than the first interval a; wherein
the responses generated by said element detectors have a minimum predetermined size l relative to the intervals a and b; and wherein
the distance e satisfies the dual inequality $$b - l < e < a + l,$$

where $$a - b + 2l > 0.$$

13. A reading device according to claim 9, wherein said element detectors are magneto-resistive transducers.

14. A reading device according to claim 10, wherein said element detectors are magneto-resistive transducers.

15. A reading device according to claim 11, wherein said element detectors are magneto-resistive transducers.

16. A reading device according to claim 10, which is adapted for reading CMC 7 characters.

* * * * *

UNITED STATES PATENT AND TRADEMARK OFFICE
CERTIFICATE OF CORRECTION

PATENT NO. : 4,232,216

DATED : November 4, 1980

INVENTOR(S) : Michel HELLE

It is certified that error appears in the above-identified patent and that said Letters Patent are hereby corrected as shown below:

Abstract, line 15, delete "response" and insert --responses--;

Claim 7, line 6, delete "wherein" and insert --where--.

Signed and Sealed this

Third Day of March 1981

[SEAL]

Attest:

RENE D. TEGTMEYER

*Attesting Officer*   *Acting Commissioner of Patents and Trademarks*